Patented Nov. 20, 1945

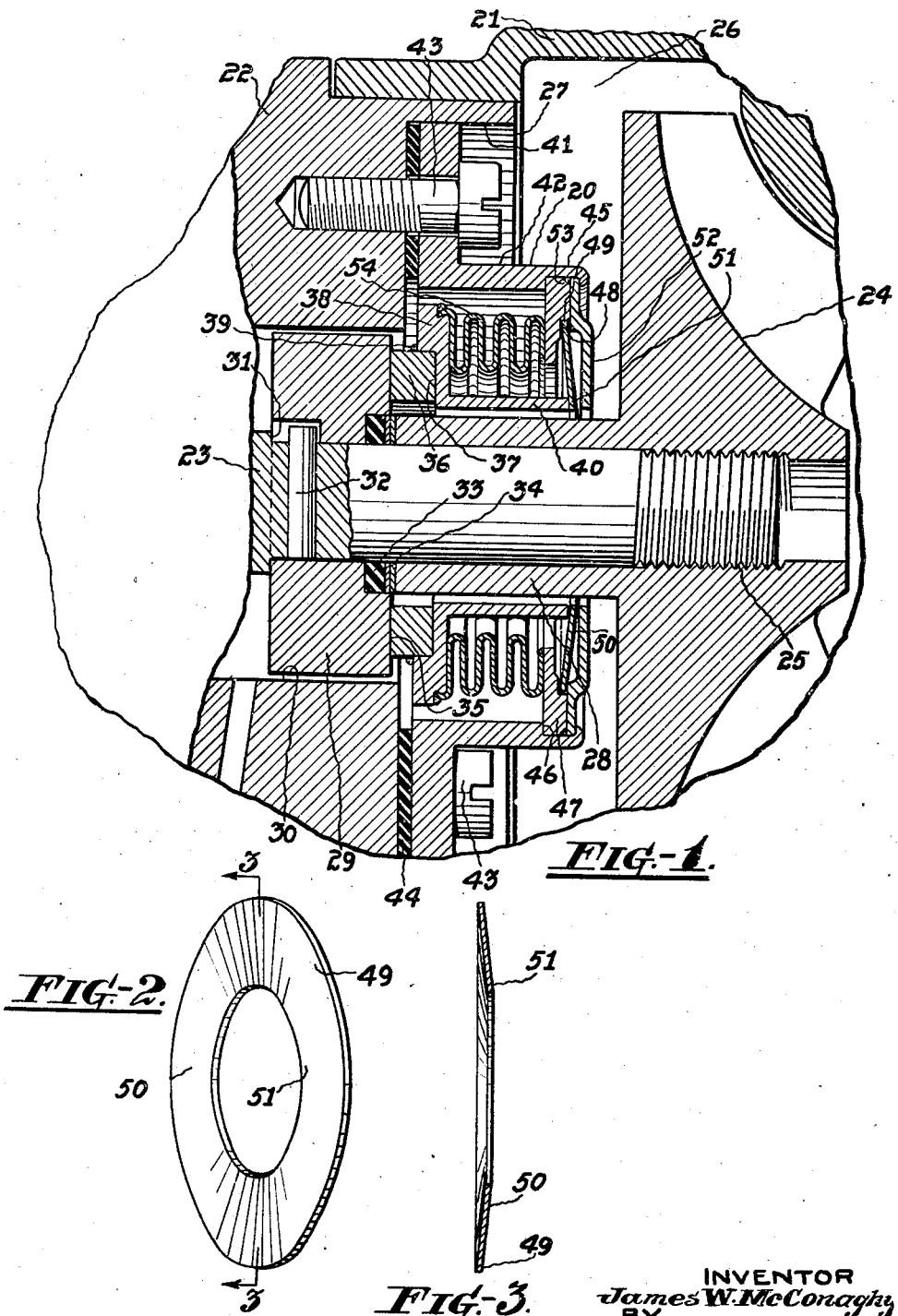

2,389,528

UNITED STATES PATENT OFFICE 2,389,528

SEALING DEVICE

James W. McConaghy, Phillipsburg, N. J., assignor to Ingersoll-Rand Company, New York, N. Y., a corporation of New Jersey Application March 17, 1944, Serial No. 526,889

3 Claims. (Cl. 286—11)

This invention relates to a sealing device for a rotary member, as for example the shaft of a centrifugal pump.

More particularly the invention relates to that class of sealing devices known as mechanical seals in which end surfaces of rotary and non-rotary members cooperate to perform the sealing function. One of the members is capable of shifting longitudinally of the other member so that a limited quantity of fluid may enter between the members for lubricating their cooperating surfaces.

One object of the invention is to assure the retention of the non-rotary member in the correct sealing and operative relations with the other sealing component.

Another object is to prevent the occurrence of undue vibratory movement of the movable sealing member and parts associated therewith.

Other objects will be in part obvious and in part pointed out hereinafter.

In the drawing accompanying this specification and in which similar reference numerals refer to similar parts, Figure 1 is a longitudinal elevation, partly in section, of a pump equipped with a sealing device constructed in accordance with the practice of the invention, Figure 2 is a perspective view of a detail, and Figure 3 is a transverse view taken through Figure 2 on the line 3—3.

Referring more particularly to the drawing, 20 designates the sealing device and 21 a pump embodying it.

The pump is shown as being of the centrifugal type and comprises a casing 22, a shaft 23 extending through the casing and an impeller 24 mounted on the shaft and secured thereto by a threaded connection 25. The chamber 26 within the casing 22 containing the impeller may be provided with the usual inlet and outlet openings (not shown) and as will be readily understood the chamber 26 is subjected to the discharge pressure of the fluid being pumped.

The impeller is spaced from the end wall 27 of the chamber 26 so that fluid may circulate freely therebetween and carries, on its rearward end, an annular extension 28 that encircles the shaft and abuts an end of a collar 29 arranged upon the shaft 23. The collar 29 lies within a bore 30 in the casing 22 and its opposite end seats against a shoulder 31 on the shaft 23.

The collar is keyed to the shaft by a pin 32, and in the end of the collar adjacent the extension 28 is a plastic packing member 33 to prevent the leakage of fluid through the collar along the shaft. Preferably, a pair of metallic plates 34 are interposed between the packing member 33 and the end of the extension 28 to prevent the marring of the packing member by the end of the extension during the assembling of the impeller on the shaft.

The end of the collar 29 confronting the chamber 26 constitutes a sealing surface 35 that cooperates with an end of an annular sealing member 36 encircling the shaft 23. The sealing member 36 is the non-rotary component of the sealing device. It is seated in a recess 37 in the end surface of a holder 38 and may be secured thereto in any suitable manner, as by welding 39. The portion of the holder 38 containing the sealing member 36 is in the form of an annular plate the marginal portion of which extends well beyond the periphery of the sealing member, and at the inner portion of the plate is an annular extension 40 that projects toward the impeller 24 and encircles the extension 28.

The internal diameters of the sealing member 36 and the extension 40 are somewhat larger than the extension 28 to assure against contact of the holder and the sealing member with the extension 28.

As a preferred arrangement the end wall 27 is provided with a recess 41 to receive the holder 38 and the sealing member and also a cage 42 encircling them. The cage is secured to the bottom of the recess by screws 43 and a sealing member 44 is clamped between the cage and the bottom of the recess 41. The body of the cage 42 is of cylindrical shape and its interior is enlarged at the end adjacent the impeller 24 to provide a thin-walled section 45 and also a shoulder 46 that serves as a seat for an annular plate 47 arranged in the end of the cage. The peripheral surface of the plate 47 is preferably fitted snugly in the cage and the end surface of said plate is in fluid tight engagement with the shoulder 46 to prevent the leakage of fluid from the chamber 26 along these surfaces into the cage.

In the end surface of the plate 47 confronting the impeller 24 is an annular recess 48 to receive the outer marginal portion 49 of a spring 50 that serves to hold the sealing member 36 in engagement with the surface 35. The spring 50 is in the form of an annular plate that is dish-shaped from its inner edge to its outer edge and engages the extension with the inner marginal zone 51 of its concave surface. The outer marginal portion of the spring is, moreover, so located with respect to the normal position of the free end of the extension 40 that when the sealing device is placed in the operative position in the pump the extension will flex the spring 50 in the degree required to maintain the sealing member in the correct sealing relation with the surface 35.

The marginal portion 51 of the spring is in frictional engagement only with the extension and the outer marginal portion of the spring is also seated loosely in the recess 48 to permit the free flexing of all portions of the spring and also to permit of such angular adjustment of the outer marginal portion of the spring as may be occasioned through variations in the dish-angle of the spring, as when endwise thrust of the shaft is imparted by the extension 40 to the marginal zone 51 of the spring. The outer zone of the spring is retained, however, against axial movement by a plate 52 overlying said portion and the adjacent surface of the plate 47 to which it is preferably secured by welding 53. The plates 47 and 52 are conveniently retained in the end of the cage by crimping the free end of the thin-walled section 45 over the outer side of the plate 52.

Inasmuch as the marginal portions of the spring are in frictional engagement only with the adjacent elements it is possible that fluid may leak thereover to the exterior of the extension 40, and suitable means are accordingly provided to prevent such fluid from passing through the cage 42 into the bore 30. To this end an annular resilient sealing member 54, commonly known as a Sylphon, is disposed about the extension 40 between the plate 47 and the holder 38. The sealing member 54 is sufficiently larger than the extension 40 to avoid contact between the two and its ends are hermetically connected to the plate 47 and to the marginal portion of the holder 38 to prevent such fluid as may find its way around the outer edge of the spring 50 and between the contacting surfaces of the spring and the extension 40 from flowing into the bore 30 and to prevent the holder 38 from rotating with the collar 29.

In practice the sealing device, including the cage 42, is placed in the recess 41 as a unit and the sealing member 36 is seated against the sealing surface 35. The screws 43 are then manipulated to secure the cage 42 to the casing 22 and in so doing the cage will be moved axially of and in the direction of the sealing surface 35. Such relative movement of the parts will cause the extension 40 to flex the spring 50 and thereby place it under the tension required to assure the necessary pressure on the sealing member for holding the latter against the sealing surface 35.

The pressure thus exerted by the spring 50 will also maintain the sealing device coaxial with the sealing surface as well as to suppress vibration of the non-rotary parts of the sealing device relatively to the collar. This is extremely desirable in devices of this character since, in addition to maintaining the required seal between the pumping chamber and the bore in the casing containing the shaft it also prevents the subjecting of the Sylphon to undue vibration and early failure.

While I have shown and described only one form which the invention may assume in practice, it is to be understood that it is readily susceptible of further modification and that it is applicable for service other than that suggested without departing from the spirit of the invention and the scope of the claims. Thus, for example, the thickness of the spring 50 may be varied to vary its rigidity and the proportions of the parts controlling the degree of flexion of the spring may also be changed in accordance with immediate requirements, as will be readily understood.

I claim:

1. In a sealing device, the combination of a casing having a chamber for fluid and a rotor having a sealing surface, an annular sealing member to cooperate with the sealing surface for controlling the leakage of fluid from the chamber, an annular extension for the sealing member, said sealing member and said extension encircling the rotor in spaced relation with respect to the rotor, a support member on the casing arranged in coaxial relationship with the rotor, and an annular plate spring of dish-shape having an annular marginal portion seated in the support member and another annular marginal portion of its concave surface in frictional engagement with an end of the extension and being flexed to press the sealing member against the sealing surface and to suppress vibration of the sealing member.

2. In a sealing device, the combination of a casing having a chamber for fluid and a rotor having a sealing surface, an annular sealing member to cooperate with the sealing surface for controlling the leakage of fluid from the chamber, an annular extension for the sealing member, said sealing member and said extension encircling the rotor in spaced relation with respect to the rotor, a support member on the casing, and an annular plate spring of dish-shape having an annular marginal portion seated in the support and its dished portion in frictional engagement with the extension and being flexed to press the sealing member into sealing engagement with the sealing surface and to suppress vibration of the sealing member.

3. In a sealing device, the combination of a casing having a chamber for fluid and a rotor having a sealing surface, an annular sealing member to cooperate with the sealing surface for controlling the leakage of fluid from the chamber, a holder for the sealing member having an annular extension to loosely encircle the shaft, a cage on the casing encircling the sealing member and the holder, an annular plate spring of dish-shape having its outer marginal portion seated in the cage and the inner marginal zone of its concave surface in frictional engagement with an end of the extension and being flexed to press the sealing member against the sealing surface and to suppress vibration of the holder and the sealing member, and an annular resilient sealing member encircling the extension and hermetically connected to the cage and the holder for preventing the fluid leaking around the marginal portions of the spring to the exterior of the extension from flowing through the cage and along the surface of the rotor.

JAMES W. McCONAGHY.